US010642802B2

(12) United States Patent
Balasubramanian et al.

(10) Patent No.: US 10,642,802 B2
(45) Date of Patent: *May 5, 2020

(54) IDENTIFYING AN ENTITY ASSOCIATED WITH AN ONLINE COMMUNICATION

(71) Applicant: INTERNATIONAL BUSINESS MACHINES CORPORATION, Armonk, NY (US)

(72) Inventors: Swaminathan Balasubramanian, Troy, MI (US); Radha M. De, West Bengal (IN); Ashley D. Delport, Durban (ZA); Indrajit Poddar, Sewickley, PA (US); Cheranellore Vasudevan, Bastrop, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/243,797

(22) Filed: Jan. 9, 2019

(65) Prior Publication Data

US 2019/0146957 A1 May 16, 2019

Related U.S. Application Data

(63) Continuation of application No. 15/067,904, filed on Mar. 11, 2016, now Pat. No. 10,225,227, which is a
(Continued)

(51) Int. Cl.
*G06F 16/21* (2019.01)
*G06N 7/00* (2006.01)
(Continued)

(52) U.S. Cl.
CPC .......... *G06F 16/21* (2019.01); *G06F 17/2785* (2013.01); *G06N 7/005* (2013.01);
(Continued)

(58) Field of Classification Search
CPC .......... H04L 51/28; H04L 43/16; H04L 67/10
(Continued)

(56) References Cited

U.S. PATENT DOCUMENTS

2005/0278139 A1 12/2005 Glaenzer et al.
2007/0130368 A1 6/2007 Martin et al.
(Continued)

FOREIGN PATENT DOCUMENTS

WO 2014105640 A1 7/2014

OTHER PUBLICATIONS

Sharing/Unsharing Social Media Content Based on Analyzing Sentiment Directed to Specific Users within that Content. IP.com, IPCOM000241336D, Apr. 17, 2015. [3 pages].
(Continued)

*Primary Examiner* — Wing F Chan
*Assistant Examiner* — Leon Y Tseng
(74) *Attorney, Agent, or Firm* — The Steadman Law Firm PLLC

(57) ABSTRACT

An approach is described for identifying an entity associated with a communication in an online environment. A method pertaining to such approach may include receiving a communication within the online environment. The communication may be received via a communications network. The communication may include a plurality of sequential messages. The method further may include facilitating parsing, via natural language processing, of language in the communication corresponding to an entity and one or more sentiments associated with the entity. The method further may include determining whether the entity is unambiguously identifiable. Upon determining that the entity is not unambiguously identifiable, the method may include identifying the entity based upon Bayesian inference. According to an embodiment, determining whether the entity is unambigu-
(Continued)

ously identifiable may include determining whether the entity is among a plurality of participants in the communication.

20 Claims, 4 Drawing Sheets

Related U.S. Application Data continuation of application No. 14/949,875, filed on Nov. 23, 2015, now Pat. No. 10,230,677.

(51) Int. Cl.
| | | |
|---|---|---|
| G06F 17/27 | (2006.01) | |
| H04W 12/12 | (2009.01) | |
| H04W 4/21 | (2018.01) | |
| H04L 12/58 | (2006.01) | |
| H04L 29/08 | (2006.01) | |

(52) U.S. Cl.
CPC .............. *H04L 51/28* (2013.01); *H04L 51/32* (2013.01); *H04L 67/10* (2013.01); *H04L 67/146* (2013.01); *H04L 67/306* (2013.01); *H04W 4/21* (2018.02); *H04W 12/12* (2013.01)

(58) Field of Classification Search
USPC ........................................................ 709/206
See application file for complete search history.

(56) References Cited

U.S. PATENT DOCUMENTS

| | | |
|---|---|---|
| 2008/0282324 A1 | 11/2008 | Hoal |
| 2009/0204596 A1 | 8/2009 | Brun et al. |
| 2009/0299925 A1 | 12/2009 | Ramaswamy et al. |
| 2011/0047265 A1 | 2/2011 | Withers et al. |
| 2011/0093498 A1 | 4/2011 | Lunt et al. |
| 2011/0307434 A1 | 12/2011 | Rostampour et al. |
| 2012/0151046 A1 | 6/2012 | Weiss et al. |
| 2012/0158632 A1 | 6/2012 | Grenier et al. |
| 2013/0080641 A1 | 3/2013 | Lui et al. |
| 2013/0346067 A1 | 12/2013 | Bhatt |
| 2015/0278195 A1 | 10/2015 | Yang et al. |
| 2016/0148211 A1 | 5/2016 | Stibel et al. |
| 2017/0061136 A1* | 3/2017 | Fung .................. G06F 21/6218 |

OTHER PUBLICATIONS

IBM. Method and System for Preventing Cyberbullying. IP.com, IPCOM000190517D, Dec. 3, 2009. [4 pages].

Bayzick, Jennifer, et al. Detecting the Presence of Cyberbullying Using Computer Software. Proceedings of the ACM WebSci'11, Jun. 14-17, 2011, Koblenz, Germany, pp. 1-2.

Dinakar, Karthik, et al. Commonsense Reasoning for Detection, Prevention and Mitigation of Cyberbullying. ACM Trans. Interact. Intell. Syst. 2, 3, Article 18, Sep. 2012, 30 pages. ACM: New York, NY.

CBSNews. Detecting, Fighting Cyberbullying of Kids, Teens. CBSNews.com, Aug. 24, 2010. [5 pages] >http://www.cbsnews.com/news/detecting-fighting-cyberbullying-of-kids-teens/>.

Foley, Richard. Text analytics: how to capture the online bully. SAS Blogs: The Text Frontier, Oct. 22, 2010. [4 pages] <http://blogs.sas.com/content/text-mining/2010/10/22/text-analytics-how-to-capture-the-online-bully/>.

Tutorial on Bayesian Networks with Netica. Norsys Software Corp., Document archived Jun. 29, 2013. [12 pages].

Galitsky, Boris. Detecting Rumor and Misinformation by Web Mining. Sociotechnical Behavior Mining: From Data to Decisions? Papers from the 2015 AAAI Spring Symposium, Mar. 23-25, 2015, pp. 16-23.

Dewan, Prateek, et al. Towards Automatic Real Time Identification of Malicious Posts on Facebook. IEEE 2015 Thirteenth Annual Conference on Privacy, Security and Trust, Jul. 21-23, 2015. [8 pages].

List of IBM Patents or Patent Applications Treated as Related, Jan. 9, 2019. [2 pages].

\* cited by examiner

IDENTIFYING AN ENTITY ASSOCIATED WITH AN ONLINE COMMUNICATION

BACKGROUND

The various embodiments described herein generally relate to online communication. More specifically, the various embodiments describe techniques for identifying an entity associated with a communication in an online environment, e.g., in a social networking environment.

A social networking environment and similar online environments facilitate online communication, often among many users. In certain scenarios, an ongoing online communication may involve a discussion regarding an entity (e.g., an individual or a group) that is not easily identifiable based upon the context of the conversation. For instance, such entity may be referred to using a relatively common name or a nickname of some form. Additionally, such entity may not be a participant in the communication. Given the relatively rapid rate at which details of the discussion may propagate throughout an online environment, identifying the affected entity may be of particular importance, especially in instances in which the discussion includes malicious or inaccurate aspects.

SUMMARY

The various embodiments described herein provide techniques for identifying an entity associated with a communication in an online environment, e.g., a social networking environment. An associated method may include receiving a communication within the online environment. The communication may be received via a communications network. The communication may include a plurality of sequential messages. The method further may include facilitating parsing, via natural language processing, of language in the communication corresponding to an entity and one or more sentiments associated with the entity. The method further may include determining whether the entity is unambiguously identifiable. Upon determining that the entity is not unambiguously identifiable, the method may include identifying the entity based upon Bayesian inference.

In an embodiment, the method step of determining whether the entity is unambiguously identifiable may include determining whether the entity is among a plurality of participants in the communication. In a further embodiment, the method step of determining whether the entity is unambiguously identifiable may occur only upon determining that a strength value of at least one sentiment among the one or more sentiments associated with the entity exceeds a predetermined sentimental threshold. In a further embodiment, the method step of identifying the entity based upon Bayesian inference may include determining a plurality of potential subjects, constructing a Bayesian network to calculate a respective conditional probability for each of the plurality of potential subjects, and identifying the entity based upon the calculated respective conditional probabilities (if possible). According to such embodiment, identifying the entity based upon the calculated respective conditional probabilities may include, upon determining that there is at least one conditional probability among the calculated respective conditional probabilities that exceeds a predetermined probability threshold, identifying as the entity a potential subject among the plurality of potential subjects having a highest conditional probability. Furthermore, according to such embodiment, the Bayesian network may be constructed based upon the plurality of sequential messages in the communication. Furthermore, according to such embodiment, the method step of determining the plurality of potential subjects may include identifying subjects in the online environment within a designated degree of separation from a plurality of participants in the communication. Additionally, according to such embodiment, the method step of constructing the Bayesian network may include configuring (e.g., constructing or updating) a Bayesian inference graph for each subject among the plurality of potential subjects based upon contents of each of the plurality of sequential messages in the communication. Nodes in each respective Bayesian inference graph configured for each subject among the plurality of potential subjects may be based upon one or more prospective attributes associated with the subject. The respective conditional probability for each subject among the plurality of potential subjects may be calculated based upon edges between the nodes in the respective Bayesian inference graph configured for the subject.

An additional embodiment includes a computer program product including a computer readable storage medium having program instructions embodied therewith, wherein the program instructions may be executable by a computing device to cause the computing device to perform one or more steps of the above recited method. A further embodiment includes a system having a processor and a memory storing an application program, which, when executed on the processor, performs one or more steps of the above recited method.

BRIEF DESCRIPTION OF THE DRAWINGS

So that the manner in which the above recited aspects are attained and can be understood in detail, a more particular description of embodiments, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
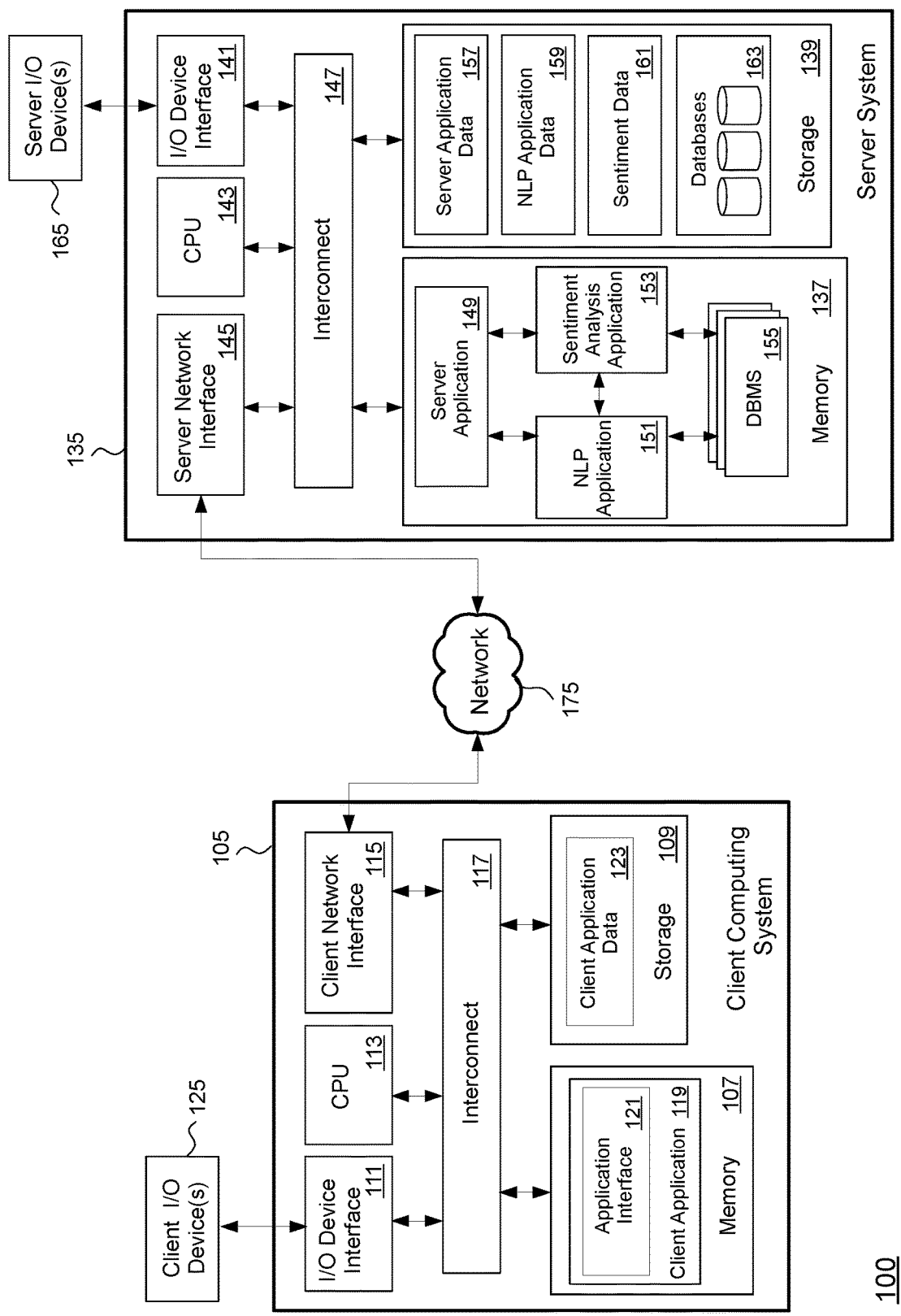
FIG. 1 illustrates a computing infrastructure, according to an embodiment.

The various embodiments described herein are directed to techniques for identifying an entity (e.g., an individual or a group) associated with a communication in an online environment, e.g., a social networking environment. The various embodiments focus in particular upon identifying an entity that is the subject of a communication involving language of relatively high sentiment. An entity may be identified in the context of the various embodiments via one or more of natural language processing, sentiment analysis, and Bayesian inference.

The various embodiments described herein may have advantages over conventional online entity identification techniques. Specifically, the various embodiments may provide the ability to identify an entity associated with an online communication that is not uniquely identifiable via a name provided in such communication. Furthermore, by identifying an entity that is the subject of an online communication involving language of high sentiment, the various embodiments may notify the entity or a network administrator regarding potentially malicious or untruthful content, and the entity or network administrator may take action to prevent or otherwise control propagation of such content or may appropriately address any communication participant responsible for such content. Some of the various embodiments may not include all such advantages, and such advantages are not necessarily required of all embodiments.

In the following, reference is made to various embodiments of the invention. However, it should be understood that the invention is not limited to specific described embodiments. Instead, any combination of the following features and elements, whether related to different embodiments or not, is contemplated to implement and practice the invention. Furthermore, although embodiments may achieve advantages over other possible solutions and/or over the prior art, whether or not a particular advantage is achieved by a given embodiment is not limiting. Thus, the following aspects, features, embodiments and advantages are merely illustrative and are not considered elements or limitations of the appended claims except where explicitly recited in a claim(s) Likewise, reference to "the invention" shall not be construed as a generalization of any inventive subject matter disclosed herein and shall not be considered to be an element or limitation of the appended claims except where explicitly recited in a claim(s).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network, and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++, or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions also may be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The various embodiments described herein may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in the cloud, without regard for the underlying physical systems (or locations of those systems) used to provide the computing resources.

Typically, cloud computing resources are provided to a user on a pay-per-use basis, where users are charged only for the computing resources actually used (e.g., an amount of storage space consumed by a user or a number of virtualized systems instantiated by the user). A user can access any of the resources that reside in the cloud at any time, and from anywhere across the Internet. In context of this disclosure, workloads of a client computing system or server system running an application according to the various embodiments described herein may be deployed to a computing cloud. Moreover, cloud-based database systems, virtual machines, and a variety of other server applications may be used to manage such workloads.

Further, particular embodiments describe techniques for identifying an entity associated with a communication in a social networking environment or other online environment. However, it should be understood that the techniques described herein may be adapted to a variety of purposes in addition to those specifically described herein. Accordingly, references to specific embodiments are included to be illustrative and not limiting.

FIG. 1 illustrates a computing infrastructure 100 according to an embodiment. Computing infrastructure 100 may constitute a portion of a social networking environment or another online environment involving person-to-person communication. As shown, computing infrastructure 100 includes a client computing system 105 and a server system 135, each of which may be connected to a communications network 175.

Illustratively, client computing system 105 may include a memory 107, storage 109, input/output (I/O) device interface 111, a central processing unit (CPU) 113, and a client network interface 115, all of which may be interconnected via interconnect 117 (e.g., a bus). Although shown as a single computing system, client computing system 105 is included to be representative of a single client or multiple clients. In an embodiment, client computing system 105 may be a thin client. Memory 107 may include a client application 119. Client application 119 may be an online application configured for interfacing with server system 135 and other computing systems. Client application 119 may include an online application interface 121. Storage 109 may include client application data 123 associated with client application 119. I/O device interface 111 may be communicatively coupled to one or more client I/O devices 125. CPU 113 is included in FIG. 1 to be representative of a single CPU, multiple CPUs, a single CPU having multiple processing cores, and the like. Client network interface 115 may receive data from and transmit data to server system 135 via network 175.

Server system 135 may include a memory 137, storage 139, I/O device interface 141, a CPU 143, and a server network interface 145, all of which may be interconnected via interconnect 147 (e.g., a bus). Although shown as a single computing system, server system 135 is included to be representative of a single server system or multiple server systems. Memory 137 may include a server application 149 (e.g., an application for facilitating communication analysis), a natural language processing (NLP) application 151, a sentiment analysis application 153, and a database management system (DBMS) 155. DBMS 155 is included be representative of a single database system or multiple database systems. Storage 139 may include server application data 157, NLP application data 159, sentiment data 161, and databases 163. Server application 149 may generate and process server application data 157 based upon interaction with client computing system 105. To address requests of client computing system 105, server application 149 may send such requests to sentiment analysis application 151 or natural language processing application 153. NLP application 151 may send requests to DBMS 155 to determine one or more language relationships and to generate NLP application data 159. Furthermore, NLP application 151 may parse, or may facilitate parsing of, various words in a message within a communication. NLP application 151 in certain instances may communicate directly with sentiment analysis application 153 as necessary. Additionally, sentiment analysis application 153 may send database requests to DBMS 155, and sentiment analysis application 153 may process results returned by DBMS 155 to generate sentiment data 161. DBMS 155 may include a software application configured to manage databases 163. Databases 163 may include one or more relational databases. Additionally, databases 163 may include one or more ontology trees or other ontological structures. While FIG. 1 illustrates three databases 163, computing infrastructure 100 may include any number of databases. According to an embodiment, DBMS 155 may send requests to remote databases (not shown) via network 175.

I/O device interface 141 may be communicatively coupled to one or more server I/O devices 165. CPU 143 is included in FIG. 1 to be representative of a single CPU, multiple CPUs, a single CPU having multiple processing cores, and the like. Server network interface 145 may receive data from and transmit data to client computing system 105 via network 175. Specifically, server application 149 may accept requests sent by client computing system 105 to server system 135 and may transmit data to client computing system 105 via server network interface 145.

In an alternative embodiment, NLP application 151 and sentiment analysis application 153 may be incorporated directly into server application 149 such that tools for sentiment analysis and natural language processing may be provided directly via server application 149. According to such alternative embodiment, NLP application data 159 and sentiment data 161 may constitute respective portions of server application data 157. Moreover, according to such alternative embodiment, server application 149 may communicate directly with database management system (DBMS) 155 to execute functions related to natural language processing and sentiment analysis.

In a further alternative embodiment, functions related to natural language processing or sentiment analysis may be executed externally to server system 135. According to such alternative embodiment, server application 149 may communicate with applications external to server system 135 in order to obtain information or results regarding natural language processing or sentiment analysis. Furthermore, according to such alternative embodiment, a database management system and one or more databases external to server system 135 may provide information or capabilities necessary for natural language processing or sentiment analysis.

Figure 2:
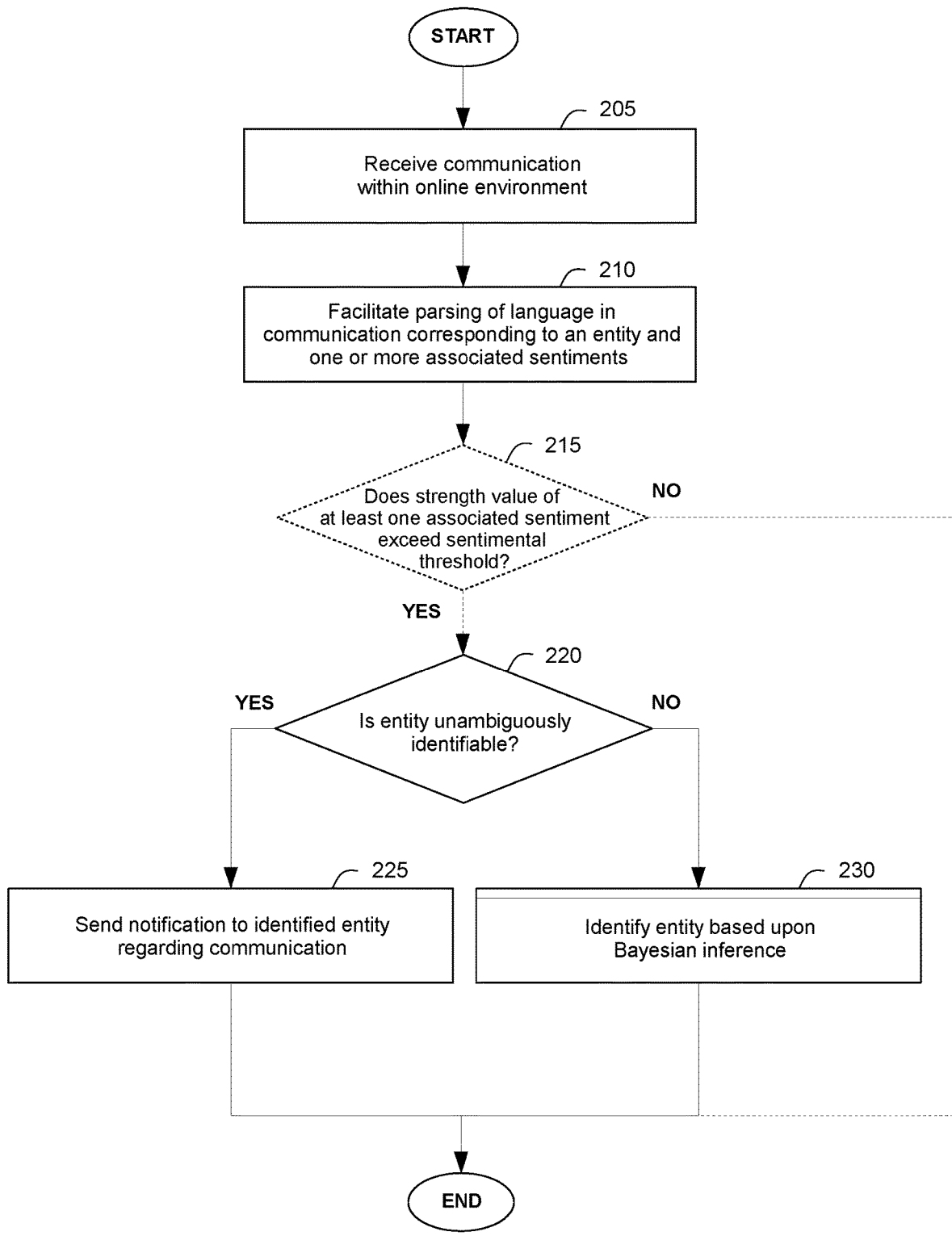
FIG. 2 illustrates a method of identifying an entity associated with an online communication in an online environment, according to an embodiment.

FIG. 2 illustrates a method 200 of identifying an entity associated with an online communication in an online environment (e.g., including computing infrastructure 100), according to an embodiment. Such online environment may be a social networking environment. A communication analysis application (e.g., server application 149) may facilitate identification of an entity according to the method 200. The communication analysis application may be located in a server system in the online environment (e.g., server system 135). According to the method 200, the communication analysis application may identify an entity discussed in a communication involving relatively high sentiment. The method 200 may begin at step 205, where the communication analysis application may receive a communication within the online environment. The communication may include a plurality of sequential messages, which may be received over a period of time. The communication analysis application may receive the communication via a communications network (e.g., network 175).

At step 210, the communication analysis application may facilitate parsing of language in the communication corresponding to an entity and one or more sentiments associated with the entity. In an embodiment, to facilitate such parsing, the communication analysis application may send the plurality of sequential messages in the communication to a natural language processing application (e.g., NLP application 151 on server system 135). According to such embodiment, the natural language processing application may parse the language of the plurality of sequential messages in the communication to determine language corresponding to an entity and language corresponding to one or more sentiments associated with the entity. For instance, language corresponding to an entity may be identified by the presence of one or more proper nouns, and language corresponding to one or more sentiments associated with the entity may be identified by the presence of one or more adjectives, adverbs, or other modifiers. Through such parsing, the natural language processing application may isolate for analysis an entity discussed in the communication as well as one or more sentiments associated with the entity.

Optionally, at step 215, the communication analysis application may determine whether a strength value of at least one sentiment among the one or more sentiments associated with the entity exceeds a predetermined sentimental threshold. Specifically, in an embodiment, the communication analysis application may send information regarding the one or more sentiments determined at step 210 to a sentiment analysis application (e.g., sentiment analysis application 153 on server system 135). According to such embodiment, the sentiment analysis application may determine an appropriate strength value for each of the one or more sentiments based upon the strength of the sentiment (e.g., based upon the emotional or controversial nature of the sentiment). The strength value may be determined for a sentiment based upon information obtained from one or more databases (e.g., databases 163) or based upon information provided by a client or a server system administrator. Subsequently, in such embodiment the sentiment analysis application may compare the sentiment value determined for each of the one or more sentiments to the predetermined sentimental threshold. The communication analysis application may designate the predetermined sentimental threshold, or alternatively the communication analysis application may permit a client or a server system administrator to designate the predetermined sentimental threshold. According to an alternative embodiment, the communication analysis application may send information regarding the one or more sentiments to the natural language processing application, which may perform a similar sentiment analysis or may incorporate an analogous sentiment analysis directly into the parsing technique discussed with respect to step 210. Upon determining that no sentiment among the one or more sentiments associated with the entity exceeds the predetermined sentimental threshold, the method 200 may end. Upon determining that at least one sentiment among the one or more sentiments associated with the entity exceeds the predetermined sentimental threshold, the communication analysis application may proceed to step 220.

At step 220, the communication analysis application may determine whether the entity associated with the communication is unambiguously identifiable. If optional step 215 is included in the method 200, the communication analysis application may determine whether the entity is unambiguously identifiable according to step 220 only upon determining that a strength value of at least one sentiment among the one or more sentiments associated with the entity exceeds the aforementioned predetermined sentimental threshold. If optional step 215 is not included in the method 200, the communication analysis application may determine whether the entity is unambiguously identifiable according to step 220 following the parsing at step 210.

In an embodiment, the communication analysis application may determine whether the entity is unambiguously identifiable at step 220 by determining whether the entity is among a plurality of communication participants. For instance, the communication analysis application may determine whether the entity may be immediately distinguished among the plurality of communication participants based upon the language corresponding to the entity in the communication, e.g., based upon a comparison of the one or more proper nouns parsed from the communication language at step 210 to the respective names of each of the plurality of communication participants. Additionally or alternatively, the communication analysis application may determine whether the entity is unambiguously identifiable by determining a set of all participants in the online environment within a predetermined degree of separation from each of the plurality of communication participants and then determining whether the entity may be immediately distinguished within the set based upon the language corresponding to the entity in the communication, e.g., based upon a comparison of the one or more proper nouns parsed from the communication language at step 210 to the respective names of each of the participants in the set. The communication analysis application may designate the predetermined degree of separation in the context of step 220, or alternatively the communication analysis application may permit a client or a server system administrator to designate the predetermined degree of separation.

Upon determining that the entity is unambiguously identifiable, at step 225 the communication analysis application may send a notification to the identified entity regarding the communication. In an embodiment, the communication analysis application may intervene in the communication on behalf of the identified entity upon determining that the communication includes malicious or untruthful information regarding the identified entity or regarding an interest associated with the identified entity. For instance, upon determining the presence of malicious or untruthful information in the communication, the communication analysis application may prevent propagation of the malicious or untruthful information by removing the communication from the online environment or may penalize any communication participant responsible for disseminating such information.

Upon determining at step 220 that the entity is not unambiguously identifiable, at step 230 the communication analysis application may identify the entity based upon Bayesian inference. An entity may not be unambiguously identifiable if the entity is referred to by a relatively common name (e.g., John Smith) or by a nickname in the communication. In such case, further steps may be necessary to distinguish the entity among participants in the online environment. An embodiment pertaining to identifying the entity based upon Bayesian inference is described further herein in a method 300.

Figure 3:
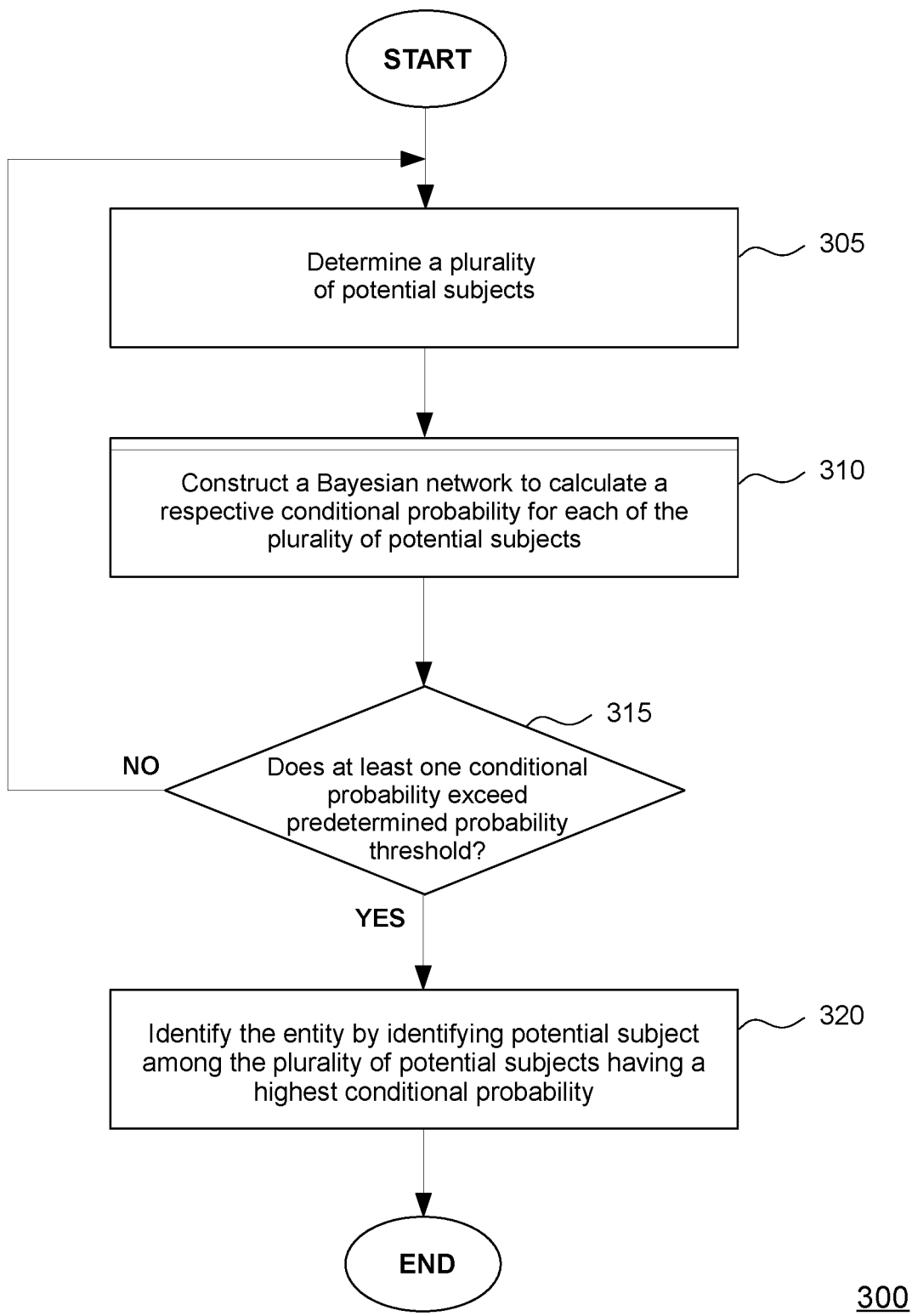
FIG. 3 illustrates a method of identifying an entity associated with an online communication based upon Bayesian inference, according to an embodiment.

FIG. 3 illustrates method 300 of identifying the entity associated with the communication based upon Bayesian inference. The method 300 provides an example embodiment with respect to step 230 of the method 200. The method 300 may begin at step 305, where the communication analysis application may determine a plurality of potential subjects. In an embodiment, the plurality of potential subjects may include a set of all participants in the online environment within a predetermined degree of separation from each of the plurality of communication participants. The predetermined degree of separation in the context of step 305 may be synonymous to the predetermined degree of separation in the context of step 220 or alternatively may be distinct from the predetermined degree of separation in the context of step 220. The communication analysis application may designate the predetermined degree of separation in the context of step 305, or alternatively the communication analysis application may permit a client or a server system administrator to designate the predetermined degree of separation.

At step 310, the communication analysis application may construct, or may facilitate construction of, a Bayesian network to calculate a respective conditional probability for each of the plurality of potential subjects determined at step 305. The Bayesian network may be constructed based on the plurality of sequential messages in the communication. Based upon Bayesian inference, the communication analysis application may incrementally construct (or may facilitate construction of) the Bayesian network by successively processing each of the plurality of sequential messages. Therefore, aspects of the Bayesian network may evolve as the communication analysis application successively processes each of the plurality of sequential messages.

The communication analysis application may construct the Bayesian network directly within the server system. Alternatively, the communication analysis application may request that the Bayesian network be created externally to the server system, e.g., within one or more client computing systems or within another server system in the online environment. In the event that the Bayesian network is created externally to the server system, the communication analysis application may obtain information regarding the Bayesian network via the communications network.

In an embodiment, the communication analysis application may construct (or may facilitate construction of) the Bayesian network according to step 310 by configuring (or by facilitating configuration of) a Bayesian inference graph for each subject among the plurality of potential subjects. Configuring (or facilitating configuration of) a Bayesian inference graph for each subject may include constructing or updating (or facilitating construction or updating of) such graph. According to such embodiment, nodes in each respective Bayesian inference graph constructed for each subject are based upon one or more prospective attributes associated with the subject based upon contents of one or more sequential messages in the communication. The one or more prospective attributes may include one or more physical characteristics prospectively associated with the subject. Furthermore, the one or more prospective attributes may include one or more events prospectively associated with the subject. Each Bayesian inference graph is unidirectional, and each edge originating from a node in each respective Bayesian inference graph may represent a conditional probability of the subject represented by the Bayesian inference graph being the entity associated with the communication given the one or more prospective attributes of the node from which the edge originates.

According to such embodiment, the communication analysis application may calculate the respective conditional probability for each subject among the plurality of potential subjects based upon edges originating from respective nodes in the respective Bayesian inference graph constructed for the subject. The respective conditional probability for each edge in the respective Bayesian inference graph constructed for the subject may be derived based upon one or more prospective attributes compared to one or more established or derived attributes for the subject as determined from any online profiles or other identifying sources with respect to the subject. Specifically, according to such embodiment, the communication analysis application may calculate a conditional probability for each edge in the respective Bayesian inference graph constructed for the subject by applying Bayes' theorem, with probabilities applied for each edge based upon the one or more prospective attributes associated with the node from which the edge originates. Each probability applied may reflect the probability that the one or more prospective attributes correspond to one or more established or derived attributes for the subject. The communication analysis application may calculate the respective conditional probability for the subject by applying Bayes' theorem to the respective conditional probabilities calculated for each edge.

Additionally, upon processing each sequential message in the communication, the communication analysis application may update the Bayesian inference graph constructed for each subject and thus may update the respective conditional probability calculated for each subject. For instance, a newly-processed sequential message may include indirect references to the entity to be identified, and based upon such indirect references the communication analysis application may determine one or more further prospective attributes to be factored into each respective Bayesian inference graph constructed for each subject. Specifically, a newly-processed sequential message may result in a new node in each respective Bayesian inference graph constructed for each subject, with the new node representing one or more further prospective attributes. Accordingly, as the communication analysis application successively processes each of the plurality of sequential messages, there may be a convergence to one of the plurality of potential subjects due to updated respective conditional probability calculations for each subject made based upon updates made to the respective Bayesian inference graphs for each subject. An embodiment pertaining to constructing the Bayesian network according to step 310 is described further herein in a method 400.

The communication analysis application may identify the entity associated with the communication based upon the respective conditional probabilities calculated at step 310, if possible. Specifically, at step 315, the communication analysis application may determine whether there is at least one conditional probability among the respective conditional probabilities calculated at step 310 that exceeds a predetermined probability threshold. The communication analysis application may determine the predetermined probability threshold via statistical analysis, or alternatively the communication analysis application may permit a client or a server system administrator to designate the predetermined probability threshold. Upon determining that there is at least one conditional probability among the respective conditional probabilities calculated at step 310 that exceeds the predetermined probability threshold, at step 320 the communication analysis application may identify the entity associated with the communication by identifying a potential subject among the plurality of potential subjects having a highest conditional probability. By ensuring that at least one conditional probability among the respective conditional probabilities exceeds the predetermined probability threshold, the communication analysis application may identify the entity with a relatively high degree of confidence.

Upon determining at step 315 that there is no conditional probability among the respective conditional probabilities calculated at step 310 that exceeds the predetermined probability threshold, the entity associated with the communication may not be identified among the plurality of potential subjects, and accordingly the communication analysis application may return to step 305. Specifically, upon determining that there is no conditional probability among the respective conditional probabilities calculated at step 310 that exceeds the predetermined probability threshold, the communication analysis application may conclude that no suitable potential subject may be identified with a relatively high degree of confidence and thus may return to step 305 to re-execute the steps of the method 300 using a different set of potential subjects from which to identify the entity. For instance, the communication analysis application may increase the predetermined degree of separation in the context of step 305 such that a greater plurality of potential subjects may be considered upon re-execution of the method 300. Alternatively, the communication analysis application may increase or otherwise modify the plurality of potential subjects by using one or more other techniques.

Figure 4:
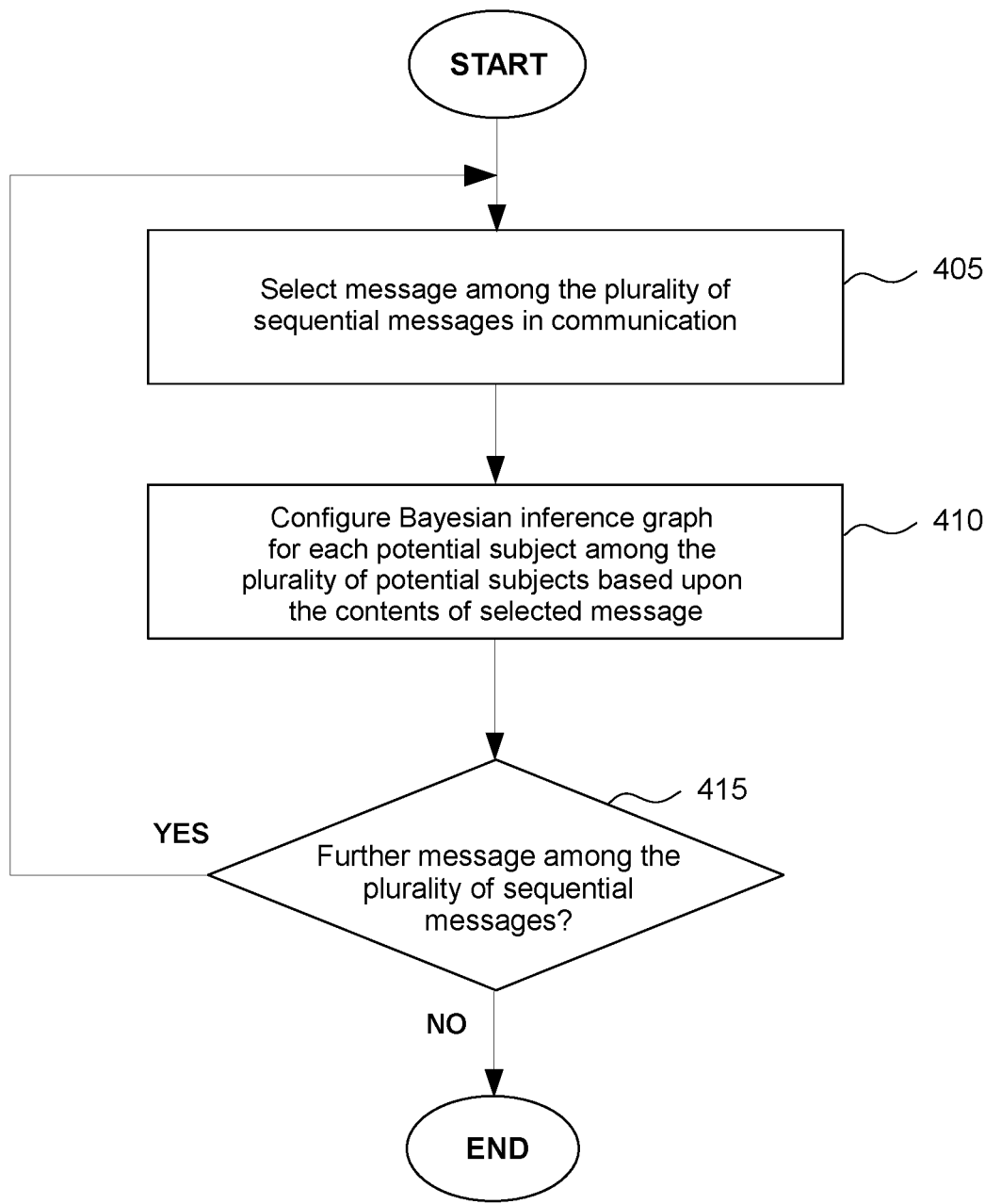
FIG. 4 illustrates a method of constructing a Bayesian network to determine a respective conditional probability for each of a plurality of potential subjects, according to an embodiment.

FIG. 4 illustrates method 400 of constructing the Bayesian network to determine the respective conditional probability for each of the plurality of potential subjects. The method 400 provides an example embodiment with respect to step 310 of the method 300. The method 400 may begin at step 405, where the communication analysis application may select a message among the plurality of sequential messages in the communication to be processed. Given the sequential nature of the messages in the communication, the communication analysis application may determine the message to be processed based upon the order of the messages in the communication (e.g., the first sequential message received may be processed first, the second sequential message may be processed second, the third sequential message may be processed third, etc.). At step 410, the communication analysis application may configure a Bayesian inference graph for each potential subject among the plurality of potential subjects based upon the contents of the message selected at step 405. More specifically, the communication analysis application may create a Bayesian inference graph for each potential subject upon processing the first sequential message in the communication and then may update the Bayesian inference graph created for each potential subject upon processing subsequent sequential messages in the communication.

At step 415, the communication analysis application may determine whether there is another message among the plurality of sequential messages in the communication to be processed. Upon determining that there is no other message in the communication to be processed, the method 400 may end. Upon determining that there is another message in the communication to be processed, the communication analysis application may return to step 405 to process such message. According to the method 400, the communication analysis application may incrementally configure the respective Bayesian inference graphs in the Bayesian network based upon processing of each sequential message in the communication. The communication analysis application may use the respective Bayesian inference graphs in the Bayesian network to calculate the respective conditional probability for each of the plurality of potential subjects in accordance with step 310 of the method 300.

By identifying an entity associated with an online communication according to the various embodiments described herein, an individual or group that is not easily identifiable may be distinguished, and in certain cases propagation of relatively highly sentimental content that may include malicious or untruthful information regarding such individual or group may be prevented or otherwise controlled.

While the foregoing description is directed to various embodiments, such description is not intended to limit the scope of the invention. All kinds of modifications made to the described embodiments and equivalent arrangements should fall within the protected scope of the invention. Hence, the scope of the invention should be explained most widely according to the claims that follow in connection with the detailed description, and should cover all the possibly equivalent variations and equivalent arrangements. Accordingly, further embodiments may be devised without departing from the basic scope of the invention.

What is claimed is:

1. A method comprising:
   receiving, via a communications network, a communication within an online environment, wherein the communication comprises a plurality of sequential messages;
   facilitating parsing, via a natural language processing application in a computing system, of language in the communication corresponding to an entity and one or more sentiments associated with the entity;
   determining whether the entity is unambiguously identifiable;
   upon determining that the entity is not unambiguously identifiable, identifying the entity by determining a plurality of potential subjects among a set of participants in the online environment and constructing a Bayesian network, wherein constructing the Bayesian network comprises configuring a Bayesian inference graph for each subject among the plurality of potential subjects based upon contents of each of the plurality of sequential messages in the communication; and
   upon determining that the communication includes untruthful information regarding the identified entity, intervening in the communication on behalf of the identified entity.

2. The method of claim 1, wherein determining whether the entity is unambiguously identifiable comprises determining whether the entity is among a plurality of participants in the communication.

3. The method of claim 1, wherein determining whether the entity is unambiguously identifiable occurs only upon determining that a strength value of at least one sentiment among the one or more sentiments associated with the entity exceeds a predetermined sentimental threshold.

4. The method of claim 1, wherein intervening in the communication on behalf of the identified entity comprises preventing propagation of the untruthful information by removing the communication from the online environment.

5. The method of claim 1, wherein intervening in the communication on behalf of the identified entity comprises preventing propagation of the untruthful information by penalizing any communication participant responsible for disseminating the untruthful information.

6. The method of claim 1, wherein the language in the communication corresponding to one or more sentiments associated with the entity is identified by a presence of one or more adjectives, adverbs, or other modifiers.

7. The method of claim 1, wherein the set of participants in the online environment includes a set of all participants within a designated degree of separation from a plurality of participants in the communication.

8. The method of claim 7, wherein the degree of separation is designated within the computing system or by an administrator of the computing system.

9. The method of claim 1, wherein nodes in each respective Bayesian inference graph configured for each subject among the plurality of potential subjects are based upon one or more prospective attributes associated with the subject.

10. The method of claim 9, wherein the respective conditional probability for each subject among the plurality of potential subjects is calculated based upon edges between the nodes in the respective Bayesian inference graph configured for the subject.

11. The method of claim 9, wherein the one or more prospective attributes associated with the subject include one or more physical characteristics prospectively associated with the subject.

12. The method of claim 9, wherein the one or more prospective attributes associated with the subject include one or more events prospectively associated with the subject.

13. A computer program product comprising a computer readable storage medium having program instructions embodied therewith, the program instructions executable by a computing device to cause the computing device to:
   receive, via a communications network, a communication within an online environment, wherein the communication comprises a plurality of sequential messages;
   facilitate parsing, via a natural language processing application in a computing system, of language in the communication corresponding to an entity and one or more sentiments associated with the entity;
   determine whether the entity is unambiguously identifiable;
   upon determining that the entity is not unambiguously identifiable, identify the entity by determining a plurality of potential subjects among a set of participants in the online environment and constructing a Bayesian network, wherein constructing the Bayesian network comprises configuring a Bayesian inference graph for each subject among the plurality of potential subjects based upon contents of each of the plurality of sequential messages in the communication; and
   upon determining that the communication includes untruthful information regarding the identified entity, intervene in the communication on behalf of the identified entity.

14. The computer program product of claim 13, wherein intervening in the communication on behalf of the identified entity comprises preventing propagation of the untruthful information by penalizing any communication participant responsible for disseminating the untruthful information.

15. The computer program product of claim 13, wherein determining whether the entity is unambiguously identifiable occurs only upon determining that a strength value of at least one sentiment among the one or more sentiments associated with the entity exceeds a predetermined sentimental threshold.

16. The computer program product of claim 13, wherein the language in the communication corresponding to one or more sentiments associated with the entity is identified by a presence of one or more adjectives, adverbs, or other modifiers.

17. A system comprising:
   a processor; and
   a memory storing an application program, which, when executed on the processor, performs an operation comprising:
      receiving, via a communications network, a communication within an online environment, wherein the communication comprises a plurality of sequential messages;
      facilitating parsing, via a natural language processing application in a computing system, of language in the communication corresponding to an entity and one or more sentiments associated with the entity;
      determining whether the entity is unambiguously identifiable;
      upon determining that the entity is not unambiguously identifiable, identifying the entity by determining a plurality of potential subjects among a set of participants in the online environment and constructing a Bayesian network, wherein constructing the Bayesian network comprises configuring a Bayesian inference graph for each subject among the plurality of potential subjects based upon contents of each of the plurality of sequential messages in the communication; and upon determining that the communication includes untruthful information regarding the identified entity, intervening in the communication on behalf of the identified entity.

18. The system of claim 17, wherein intervening in the communication on behalf of the identified entity comprises preventing propagation of the untruthful information by penalizing any communication participant responsible for disseminating the untruthful information.

19. The system of claim 17, wherein determining whether the entity is unambiguously identifiable occurs only upon determining that a strength value of at least one sentiment among the one or more sentiments associated with the entity exceeds a predetermined sentimental threshold.

20. The system of claim 17, wherein the language in the communication corresponding to one or more sentiments associated with the entity is identified by a presence of one or more adjectives, adverbs, or other modifiers.

\* \* \* \* \*